US006236805B1

(12) United States Patent
Sebestyen

(10) Patent No.: US 6,236,805 B1
(45) Date of Patent: May 22, 2001

(54) METHOD AND APPARATUS FOR STORING, SEARCHING AND PLAYING BACK AUDIOVISUAL INFORMATION AND DATA FILES

(75) Inventor: Istvan Sebestyen, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 08/913,941

(22) PCT Filed: Apr. 9, 1996

(86) PCT No.: PCT/DE96/00618

§ 371 Date: Jan. 30, 1998

§ 102(e) Date: Jan. 30, 1998

(87) PCT Pub. No.: WO96/32717

PCT Pub. Date: Oct. 17, 1996

(30) Foreign Application Priority Data

Apr. 13, 1995 (DE) .............................................. 195 14 103

(51) Int. Cl.[7] ....................................................... H04N 5/92
(52) U.S. Cl. ........................ 386/98; 386/125; 375/240.01
(58) Field of Search .............................. 386/1, 39, 45–46, 386/96, 98, 101, 104, 105–106, 125–126; 348/423; 375/240.01; 370/352, 383, 389, 390, 392, 401, 458, 410, 256; H04N 5/76, 5/92, 9/79

(56) References Cited

U.S. PATENT DOCUMENTS 5,617,384 * 4/1997 Yonemitsu et al. ...................... 386/1
5,754,241 * 5/1998 Okada et al. ............................ 386/8

FOREIGN PATENT DOCUMENTS 0 453 128   10/1991   (EP) .
0 535 890   4/1993   (EP) .

OTHER PUBLICATIONS

International Telecommunication Union publication G.722, *General Aspects of Digital Transmission Systems; Terminal Equipments, 7kHz Audio–Coding Within 64 Kbit/s*, 1993.
International Telecommunication Union publication G.723, *Study Group 15 Contribution, Dual rate speech coder for multimedia telecommunication transmitting at 5.3 & 6.3 kbit/s*, Jun. 1995.
International Telecommunication Union publication G.726, *General Aspects of Digital Transmission Systems; Terminal Equipments, 40, 32, 24, 16 kbit/s Adaptive Differential Pulse Code Modulation (ADPCM)*, Geneva, 1990.
International Telecommunication Union publication G.728, *General Aspects of Digital Transmission Systems; Terminal Equipments, Coding of Speech at 16 kbit/s Using Low–Delay Code Excited Linear Prediction*, Geneva, 1992.

(List continued on next page.)

Primary Examiner—Thai Tran
(74) Attorney, Agent, or Firm—Schiff Hardin & Waite

(57) ABSTRACT

Method and apparatus for storing, searching and playback of audiovisual items of information and data files, using a protocol for multimedia multiplexing and multimedia control, with a control for the multimedia information streams in a separate virtual control channel according to ITU-T H.245, with multiplexers or, respectively, demultiplexers for information according to ITU-T H.223, with a video compression and coding means or, respectively, video decompression and decoding means, e.g., according to ITU-T H.263, with an audio/speech compression and audio/speech decompression means for compression or, respectively, decompression with at least one high-compression speech compression algorithm, and with a control for the multimedia memory device in a separate logical control channel.

14 Claims, 2 Drawing Sheets

OTHER PUBLICATIONS

International Telecommunication Union publication G.729, *General Aspects of Digital Transmission Systems, Coding of Speech at 8 kbit/s Using Conjugate–Structure Algebraic–Code–Excited Linear–Prediction (CS–ACELP)* Mar., 1996.

International Standard ISO/IEC 11172–1 Technical Corrigendum 1, *Information technology—Coding of moving pictures and associated audio for digital storaeg media at up to about 1.5 Mbit/s* Parts 1, 2, 3 and 4, 1993.

Ackland, et al., AT&T Technical Journal, *A Video–Codec Chip Set for Multimedia Applications*, vol. 72, No. 1, pp. 50–66, Jan. 1, 1993.

Endo, et al., NEC Research & Development, *Development of CCITT Standard Video Codec: VasuaLink 5000*, vol. 32, No. 4, pp. 557–568, Oct. 1, 1991.

A. Davis, Advanced Imaging, *Videoconferencing via POTS Now: Proprietary Codecs & Emerging Standards*, vol. 10, No. 6, pp. 32, 34, 36, 38, Jun., 1995.

R. Schaphorst, Optical Engineering, *Status of H.324—The Videoconferencing Standard for the Public Switched Telephone Network and Mobile Radio*, pp. 109–112, vol. 35, No., Jan. 1, 1996.

International Telecommunication Union publication H.223, *Line Transmission of Non–Telephone Signals, Multiplexing Protocol for Low Bitrate Multimedia Communication*, May 30, 1995.

International Telecommunication Union publication H.245, *Line Transmission of Non–Telephone Signals, Multimedia System Control*, Jun. 2, 1995.

International Telecommunication Union publication H.263, *Video coding for narrow telecommunication channels*, Jun., 1995.

Telecommunication Standardization Sector H.324, *Line Transmission of Non–Telephone Signals, Terminal for Low Bitrate Multimedia Communication*, Jun. 20, 1995.

International Telecommunication Union publication ITU–T D.601 R, *Charging and Accounting in International Telecommunication Services, Determination of Accounting Rate Shares and Collection Charges in Telex Relations Between Countries in Africa*, Oct., 1993.

* cited by examiner

METHOD AND APPARATUS FOR STORING, SEARCHING AND PLAYING BACK AUDIOVISUAL INFORMATION AND DATA FILES

BACKGROUND OF THE INVENTION

The invention relates to a method and apparatus for storing, searching and playing back audiovisual information and data files. In particular, the invention relates to a multi-media memory device.

Storing and playing back items of multimedia information (video, audio, data, control information) on digital storage media (e.g., CD-ROM, optically writable hard disk, magnetic hard disk) is one of the most important functions in multimedia systems.

Although the capacity to store items of information on digital storage media is constantly growing, the large amount of data of multimedia information continues to present a massive storage problem.

A standardized method under ISO/IEC 11172 (also known as MPEG-1) enables storage of approximately one hour of audiovisual information on CD-ROM with data streams of 1.5 Mbits/s. Other, non-standardized audiovisual compression methods commonly used in PC applications also enable approximately one hour of stored audiovisual program, albeit with a worse image and tone quality.

In relation to these known methods characterized in Table 1 below, an arrangement according to the present invention enables considerably higher compression, more effective multiplexing, and more effective controlling of multimedia data streams.

TABLE 1

Examples of playback time for multimedia memory solutions based on ITU H.324

| Medium: | Memory Volume (MByte): | Playback time at 32 kbit/s QCIF (180 × 144) Image resolution at H.263; G.723; G4kbit/s audio | Playback time at 128 kbit/s CIF (360 × 288) Image resolution at H.263; G.723; G.728; G.729 audio | Playback time at 512 kbit/s ITU-R 601 (720 × 576) Image resolution at H.263; G.728, G.729; G.722 audio |
|---|---|---|---|---|
| Diskette: | 1.4 | About 6 minutes | — | — |
| CD-ROM | 660 | about 46 hours | about 11 hours | about 2.5 hours |
| Example Data File: | 10 | about 41 minutes | about 10 minutes | — |
| Hard Disk/ Minute | — | about 240 kbyte/min. | about 1 Mbyte/min | about 4 mbte/min |
| Example Hard Disk: | 540 | about 38 hours | about 9 hours | about 2.25 hours |

The quality of MPEG-1 Video and MPEG-1 Audio is indeed as a rule better than the other methods listed in Table 1, but there are numerous applications in which a reduced video and audio quality is completely sufficient (e.g. multimedia mail, video images with head and shoulders, multimedia lexicons).

SUMMARY OF THE INVENTION

The present invention provides a method and apparatus for the storing, searching and playback of audiovisual data files.

To that end, in an embodiment, the invention provides a method for storing, searching and playback of highly compressed audiovisual items of information and data files of a multimedia memory device, using a multimedia multiplexing and multimedia control protocol, with the following steps:

a) controlling multimedia streams of information in a first separate virtual control channel according to ITU-T H.245 in order to enable flexible allocation and simultaneous processing of several audio/speech, video and data channels for multimedia communication;

b) multiplexing, or, respectively, demultiplexing video items of information and/or audio/speech items of information and/or data items of information and/or control information according to ITU-T H.223 in order to enable flexible allocation of channel capacities corresponding to the current needs of the channels allocated in the preceding step;

c) compressing and coding, or, respectively, decompressing or decoding video signals according to ITU-T H.263;

d) compressing, or, respectively, decompressing the audio or, respectively, speech signals using a high-compression speech compression algorithm; and e) controlling the multimedia storage device via a second separate virtual control channel.

In an embodiment, the invention provides an apparatus for storing, searching and playing back of highly compressed audiovisual items of information and data files of a multimedia memory apparatus, using a multimedia multiplexing and multimedia control protocol, comprising: an information stream control for controlling the multimedia information streams in a separate virtual control channel according to ITU-T H.245, thereby enabling a flexible allocation and the simultaneous processing of several audio/speech channels, video channels and data channels for multimedia communication; a multiplexer and demultiplexer for multiplexing or, respectively, demultiplexing of video items of information and/or audio/speech items of information and/or data items of information and/or control information according to ITU-T H.223, thereby enabling a flexible allocation of channel capacities corresponding to the current needs of the channels allocated by the named controlling; a video compression and coding means for the compression and coding of video signals, and with a video decompression and decoding means for the decompressing and decoding of video signals; an audio/speech compression and audio/speech decompression means for the compression or, respectively, decompression of audio signals or, respectively, speech signals with a high-compression speech compression algorithm; and a device control for controlling the multimedia memory device via a further separate logical control channel.

In an embodiment, the invention provides an apparatus in which the second separate virtual control channel is an additionally opened virtual data channel according to ITU-T H.245.

In an embodiment, the invention provides an apparatus in which the audio-speech compression and audio/speech decompression means can be operated at least with a speech compression algorithm according to ITU-T G.723.1, ITU-T G.729, ITU-T G.728, ITU-T G.722, ISO/IEC 11172-3, or according to ITU-T G.4 kbit/s.

In an embodiment, the invention provides an apparatus in which the multimedia storage device is realized by a computer with a magnetic hard disk memory.

In an embodiment, the invention provides an apparatus in which the multimedia memory device is a computer with a read-only optical memory means.

In an embodiment, the invention provides an apparatus in which the multimedia storage device is a computer with a write/read optical memory means.

Depending on the individual embodiments and special features, the invention makes use as needed of the following information technology standards and/or communication technology standards:

The present standardization of speech coders in the ITU-T with very low bit rates for videotelephony (ITU-T G.723) in the public telephone dialing network (GSTN) leads to qualitatively good speech coders (approximating the quality of the recommendation CCITT G.726), with a transmission speed of 5.3 to 6.3 kbit/s. The ITU-T G.729 speech coder also enables digital speech transmission with a speed of 8 kbit/s. In the future, a 4 kbit/s coder will also be standardized (ITU-T G.4 kbit/s). The codecs are currently the most efficient speech codecs.

The present ITU-T standardization of moving image coders with very low bit rates, e.g., for videotelephony in the public telephone dialing network (ITU-T H.263), leads to qualitatively good moving image coders (QCIF resolution 180×144 and lower) with the minimum required transmission speed of 8–24 kbit/s (or higher), which require a secured type of transmission (e.g., with ITU-T H.223). An increase in the image resolution via the values defined in the standard, e.g., to CIF (360× 288) or ITU-T 601 (720×576) enables the transmission of moving images with television images or, respectively, moving images according to the resolution of the digital studio standard ITU-R 601.

The present standardization in the ITU-T of multiplexing of audiovisual types of data with very low bit rates, e.g., for videotelephony in the public telephone dialing network with a transmission speed of 9.6–32 kbit/s (and higher), which enables a secured type of transmission (according to ITU-T H.223). This principle can also be used for memory systems.

The present ITU-T standardization (ITU-T H.245) relating to the control of audiovisual types of data with very low bit rates, e.g., for videotelephony in the public telephone dialing network, which enables a flexible allocation of up to 15 independent useful channels, respectively with audio/speech information, video information or data information. This principle can also be used for memory systems. Each channel is provided with a flexible bandwidth, which can vary arbitrarily from application to application in the running of the memory application.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
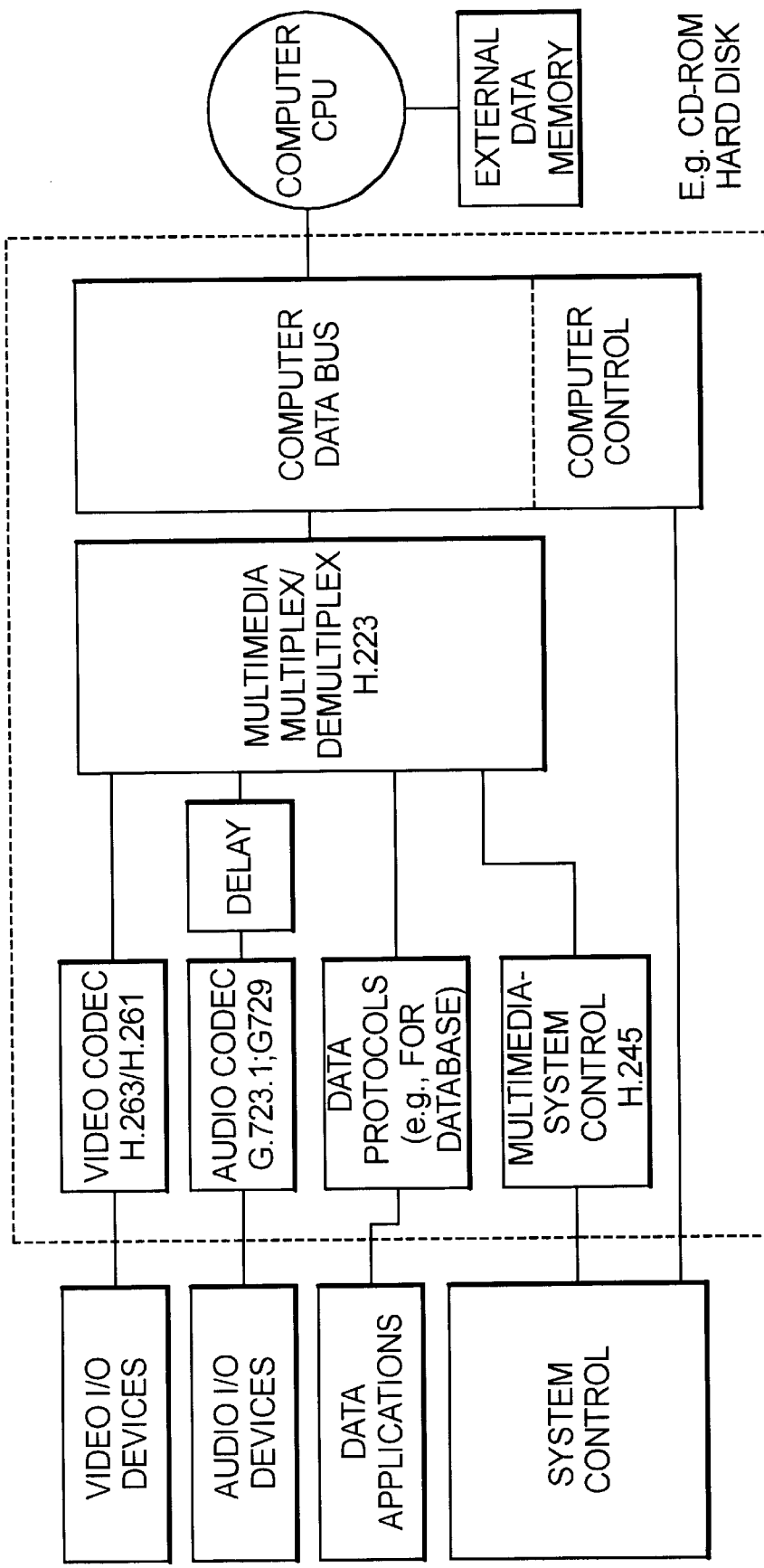
FIG. 1 is a schematic diagram of an exemplary embodiment of a multimedia memory system according to the invention.

The various standards referred to herein are incorporated by reference.

A multimedia memory system consists of several functional units. The video I/O-devices (input/output) typically contain e.g. a camera, a display screen and an image preparation unit for the mixing of several images (split-screen). In an advantageous construction of the invention, all the devices can actually be connected. Audio/speech I/O devices include a microphone (or several), one or more loudspeakers and an audio/speech preparation unit (e.g. for echo suppression). Here as well, in an advantageous construction, all the devices can actually be connected.

The system control controls the overall system, i.e., it provides for the multimedia control for the multimedia multiplexer and for the overall multimedia system control. The video codec provides for the digital compression and decompression of the video signal in the video coder or, respectively, video decoder. The audio/speech codec provides for the digital compression/decompression of the audio/speech signal. An optional delay of the speech signal can be carried out in order to achieve lip synchronization between video and speech. Given multimedia storage, the multiplexer/demultiplexer merges the audio signals, video signals and data signals in one common data stream, or, respectively, given retrieval from the multimedia data bank, separates the common multimedia data stream into separate audio, video and data signals.

The system control consists of the controlling of the multimedia multiplexing (according to ITU-T H.245) and of the overall multimedia memory system (e.g. loading/ termination of the multimedia memory program in the computer).

In multimedia multiplexing according to ITU-T H.245, up to 15 useful channels can be opened and used. According to H.245, before the storing of the useful channels, the user parameters are settled on and are set. The data memory thereby indicates the broadest possibility of storing of items of multimedia information, and the storing application makes the final decision and selects which multimedia channels are to be opened and how the multimedia storing in the data memory is to take place.

For the storing of an audiovisual message (voice mail), one channel for video, one channel for speech, a data channel for the voice mail control (addressing, time of the storing of the voice mail, etc.) and the obligatory ITU-T H.245 multimedia control channel could for example be opened.

For the storing of an audiovisual German-French language course, one channel for video, one channel each for sound in German and in French, one data channel each for the German and for the French accompanying text, one data channel for the language course program control, and the obligatory ITU-T H.245 multimedia control channel could for example be opened.

For the storing of a sports film sequence (e.g., soccer), one channel could for example, first be allocated to for sound and one channel to for image. Following a goal, for example, five channels could for example, be allocated in the short term for video. A different camera position is assigned to each channel. By this means, during playback the user could dynamically select an arbitrary camera position (e.g., from above, from the goal perspective, from behind, or from the side).

Before the playback of the useful channels, the user parameters are also settled on and are set according to ITU-T H.245. The data memory thereby indicates the broadest possible storing of multimedia items of information. Here as well, the playback application (i.e., the multimedia memory system) makes the final selection of the multimedia channels to be opened, and determines how the multimedia playback from the data memory is to take place.

Figure 2:
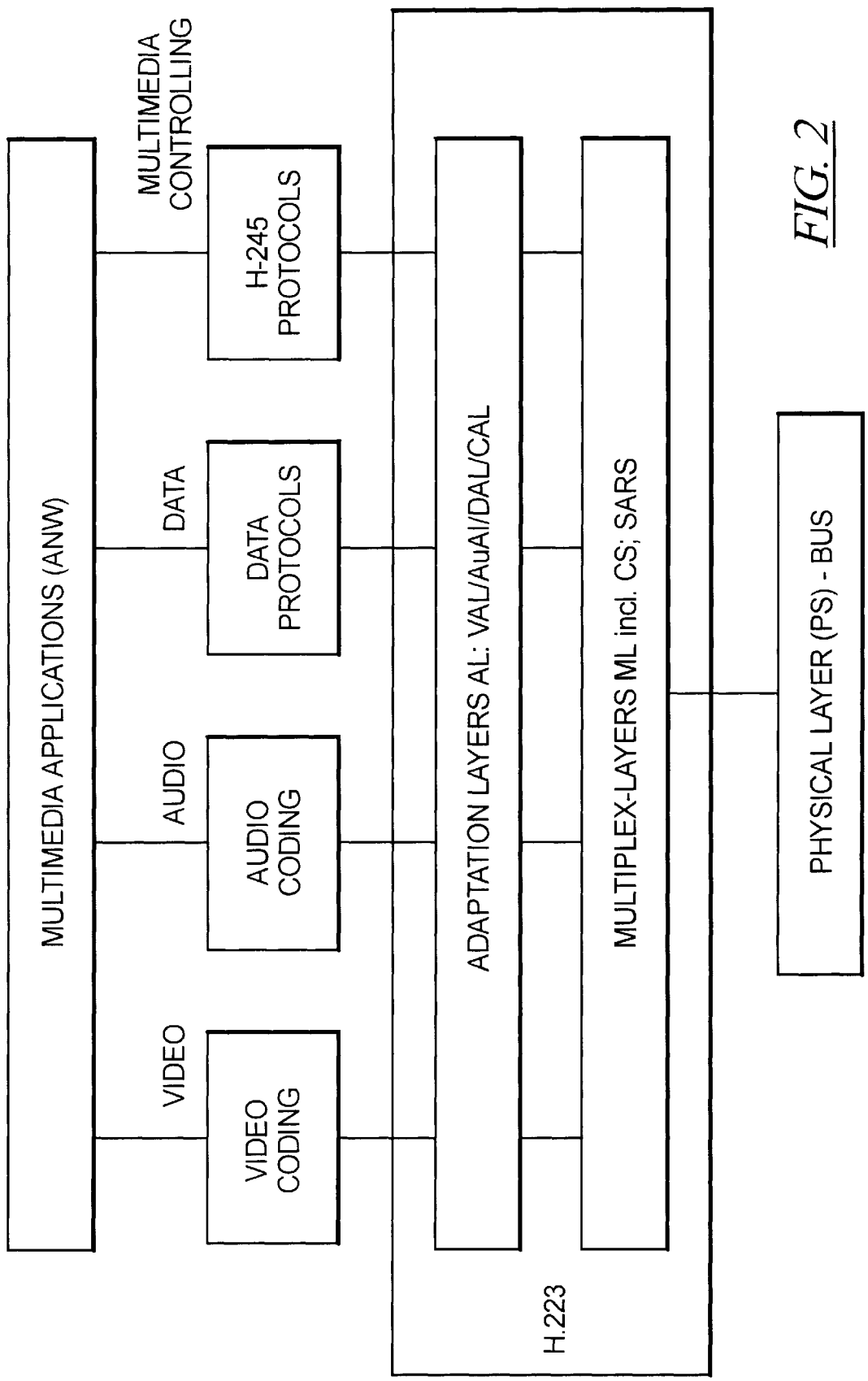
FIG. 2 illustrates a multimedia multiplexing scheme.

FIG. 2 illustrates the multimedia multiplexing. The lowest layer PS is the physical layer. This is realized in the computer bus, the interface between the external digital memory (CD-ROM, hard disk, etc.), and the multimedia multiplexing. The multiplexer (similar to ITU-T H.223, with the difference that multimedia data are provided not for an analog telephone network, but rather for the bus of a computer) is provided with two layers: what is known as an adaptation layer AL and a multiplex layer ML. The adaptation layer AL is responsible for the adaptation of the diverse streams of information (which come from the different media sources (video, audio/speech, data)) to the multiplex layer ML.

In FIG. 2, four adaptation layers AL are specified: a data adaptation layer DAL, an audio/speech adaptation layer AuAL, a video adaptation layer VAL and a control adaptation layer CAL for the transmission of multimedia control data. In the multiplex layer ML, each adaptation layer makes use of the services of what is called a convergence sublayer CS and what is called a segmentation/assembly sublayer SARS. The convergence sublayer CS provides for error recognition and for error correction. The segmentation and reassembly sublayer SARS provides for the fragmentation of the data streams into what are known as SAR-SDUs (SDU—service data unit), tailored to the multiplex layer ML.

The video codec (video), which codes or, respectively, decodes the video items of information, is located above the video adaptation layer AL. The audio codec (audio), which codes or, respectively, decodes the audio items of information, is located above the audio adaptation layer AL. The data protocols necessary for the data application are located above the data adaptation layer AL (data). A special data channel is allocated to the ITU-T H.245 multimedia control protocols.

The adaptation layers AL display transmission errors during storage, and error corrections are initiated. The adaptation layer AL further fragments the information streams into smaller units.

The multiplex layer ML provides for the multiplexing of the various types of information that are prepared by the adaptation layers AL. During access/playback, the multiplex layer ML provides for just demultiplexing of the arrived data stream into data fragments of the various types of information that are forwarded to the respectively responsible adaptation layer AL. The adaptation layers AL assemble the individual data streams from the data fragments, which streams are forwarded to the applications (speech/audio, video, data, multimedia control).

Although modifications and changes may be suggested by those skilled in the art, it is the intention of the inventors to embody within the patent warranted hereon all changes and modifications as reasonably and properly come within the scope of their contribution to the art.

What is claimed is:

1. A method for storing, search and playback of highly compressed audiovisual items of information and data files of an electronic multimedia memory device, using a multimedia multiplexing and multimedia control, comprising the following steps:

a) controlling multimedia streams of information in a first separate virtual control channel according to ITU-T H.245 in order to enable flexible allocation and simultaneous processing of several audio/speech, video and data channels for multimedia communication;
   b) multiplexing or, respectively, demultiplexing video items of information and/or audio/speech items of information and/or data items of information and/or control information according to ITU-T H.223 in order to enable flexible allocation of channel capacities corresponding to the current needs of the channels allocated in the preceding step;
   c) compressing and coding, or, respectively, decompressing and decoding video signals;
   d) compressing or, respectively, decompressing the audio or, respectively, speech signals using a high-compression speech compressing algorithm; and
   e) controlling the electronic device via a second separate virtual control channel.

2. An apparatus for storing, searching and playback of highly compressed audiovisual items of information and data files of an electronic multimedia memory apparatus, using a multimedia multiplexing and multimedia control, comprising:

an information stream control for controlling the multimedia information streams in a separate virtual control channel according to ITU-T H.245, thereby enabling a flexible allocation and the simultaneous processing of several audio/speech channels, video channels and data channels for multimedia communication;
   a multiplexer and demultiplexer for multiplexing or, respectively, demultiplexing of video items of information and/or audio/speech items of information and/ or data items of information and/or control information according to ITU-T H.223, thereby enabling a flexible allocation of channel capacities corresponding to the current needs of the channels allocated by the named controlling;
   a video compression and coding means for the compression and coding of video signals, and with a video decompression and decoding means for the decompressing and decoding of video signals;
   an audio/speech compression and audio/speech decompression means for the compression or, respectively, decompression of audio signals or, respectively, speech signals with a high-compression speech compression algorithm; and
   a device control for controlling the multimedia memory device via a further separate logical control channel.

3. An apparatus according to claim 2, characterized in that the second separate virtual control channel is an additionally opened virtual data channel according to ITU-T H.245.

4. An apparatus according to claim 2, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

5. An apparatus according to claim 2, characterized in that the multimedia storage device is realized by a computer with a magnetic hard disk.

6. An apparatus according to claim 2, characterized in that the multimedia memory device is a computer with a read-only optical memory means.

7. An apparatus according to claim 2, characterized in that the multimedia storage device is a computer with a write/read optical memory means.

8. An apparatus according to claim 3, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4kbit/s.

9. An apparatus according to claim 3, characterized in that the multimedia storage device is realized by a computer with a magnetic hard disk.

10. An apparatus according to claim 4, characterized in that the multimedia storage device is realized by a computer with a magnetic hard disk.

11. An apparatus according to claim 3, characterized in that the multimedia memory device is a computer with a read-only optical memory means.

12. An apparatus according to claim 4, characterized in that the multimedia memory device is a computer with a read-only optical memory means.

13. An apparatus according to claim 3, characterized in that the multimedia storage device is a computer with a write/read optical memory means.

14. An apparatus according to claim 4, characterized in that the multimedia storage device is a computer with a write/read optical memory means.

* * * * *